United States Patent

Lucas et al.

[11] Patent Number: 5,081,450
[45] Date of Patent: Jan. 14, 1992

[54] APPARATUS AND METHOD FOR COMPRESSING AND EXPANDING MULTIBIT DIGITAL PIXEL DATA

[75] Inventors: Bruce D. Lucas, Yorktown Heights, N.Y.; Darwin P. Rackley, Boca Raton, Fla.; Jesus A. Saenz, Greenwich, Conn.

[73] Assignee: International Business Machines Corporation, Armonk, N.Y.

[21] Appl. No.: 491,370

[22] Filed: Mar. 9, 1990

[51] Int. Cl.⁵ .............................................. G09G 5/00
[52] U.S. Cl. .................................. 340/728; 340/731; 340/701; 382/47
[58] Field of Search ............... 340/701, 703, 731, 728; 358/133, 137, 138; 382/47

[56] References Cited

U.S. PATENT DOCUMENTS

| 3,858,240 | 12/1974 | Golding et al. | |
|---|---|---|---|
| 3,891,994 | 6/1975 | Phillips et al. | |
| 4,212,028 | 7/1980 | Drewery | |
| 4,315,278 | 2/1982 | Pasdera | |
| 4,491,861 | 1/1985 | Sochor | |
| 4,500,912 | 2/1985 | Bolger | |
| 4,580,134 | 4/1986 | Campbell et al. | 358/133 |
| 4,644,389 | 2/1987 | Nakagawa et al. | |
| 4,707,729 | 11/1987 | Bruno et al. | |
| 4,768,082 | 8/1988 | Hiratsuka et al. | 358/133 |
| 4,847,677 | 7/1989 | Music et al. | 358/133 |
| 5,003,299 | 3/1991 | Batson et al. | 340/703 |

FOREIGN PATENT DOCUMENTS 0276985 1/1987 European Pat. Off.

Primary Examiner—Jeffery A. Brier
Attorney, Agent, or Firm—Pollock, Vande Sande & Priddy

[57] ABSTRACT

Method and apparatus for converting multibit pixel data to a lesser number of bit pixel data and re-expanding the compressed data. Luminance data for each pixel is established as the 5 most significant bits of the original luminance signal. The chrominance information for groups of pixels is subsampled, and a common chrominance value assigned to each of the pixels in a group. The resulting compressed pixels may be 8 bits wide providing economical possibilities to store the 8 bit wide data. The data is expanded for display by adding lower order data bits to the compressed luminance signal data bits. A subsampled chrominance data signal is appended to the expanded luminance data for display.

22 Claims, 4 Drawing Sheets

APPARATUS AND METHOD FOR COMPRESSING AND EXPANDING MULTIBIT DIGITAL PIXEL DATA

The present invention relates to digital display systems. Specifically, a technology for compressing and expanding pixel data to decrease buffer memory size requirements and reduce data transfer time is described.

Digital display technology may be divided into two basic display systems. The first relates to natural imagery which is provided by a camera, and the second relates to computer generated graphics. The natural imagery includes a luminance (Y) component defining image brightness and a chrominance component, usually expressed as U and V components defining the color of a pixel (picture element) of the scene. The resolution of any displayed image depends on the number of pixels and the precision in which the pixel luminance and chrominance is displayed.

Pixel luminance and chrominance data is advantageously stored in a frame buffer. The size of the frame buffer must be large enough to accommodate 640 x 480 pixels, having a data width of 24 bits per pixel to derive adequate resolution for many applications.

The cost of digital display systems is directly related to the frame memory size. For each megabyte of memory storage, a cost of as much as several hundred dollars may be incurred. Therefore, any reduction in data width for each pixel provides a source of cost reduction for the digital display system.

Interest in multimedia display systems which not only display natural scene images but can also be used to display computer graphics, is prompting more effort to reduce buffer memory storage requirements. Computer graphics may be implemented with only 8 bit pixel data which selects one of 256 displayable colors. The number of colors for such graphic pixels need not be as large as the number of colors for natural scene pixels to preserve image quality. A similar reduction in pixel data width for natural scenery images would therefore aid in keeping total memory requirements to a minimum.

SUMMARY OF THE INVENTION

It is a primary object of this invention to reduce the number of bits necessary to represent pixels of an image of a natural scene.

It is a more specific object of this invention to provide data compression of pixel data to reduce frame buffer memory size requirements.

It is yet another object of the invention to expand compressed pixel data stored in a frame memory to a full width pixel data signal.

These and other objects are provided by a pixel data compression and expansion technique in accordance with the invention.

The invention makes use of an encoding scheme which reduces the pixel luminance data width to 5 bits of digital data ($Y_5$). Additionally, the chrominance is subsampled to obtain for each group of pixels common U and V chrominance values for each pixel of the group.

In carrying out the invention in accordance with a preferred embodiment, the subsampled chrominance values U and V are compressed to their 6 most significant bits. The compressed chrominance U and V data values are packed with the unique reduced width luminance values $Y_5$ of each pixel for storage in a frame memory.

The preferred packing of U and V chrominance data includes further reducing the compressed U and V data values into portions which comprise the most significant bits and the least significant bits. The four portions, $U_H$, $U_L$, $V_H$ and VL are appended to the luminance values $Y_5$ for the four pixels.

These pixel values may be stored as 8 bit pixels in a frame memory, thus providing a saving for memory storage space, or stored in permanent memory storage devices such as a CD ROM. The compressed data may be expanded by reading out the group of four pixels, and combining the $U_H$, $U_L$ portions as well as $V_H$, $V_L$ portions to obtain total U and V chrominance values. The luminance $Y_5$ and recombined chrominance U, V may be further expanded by combining a number of bits as lower order data bits to obtain 8 bit luminance, 8 bit U chrominance and 8 bit V chrominance data.

DESCRIPTION OF THE PREFERRED EMBODIMENT

Figure 1:
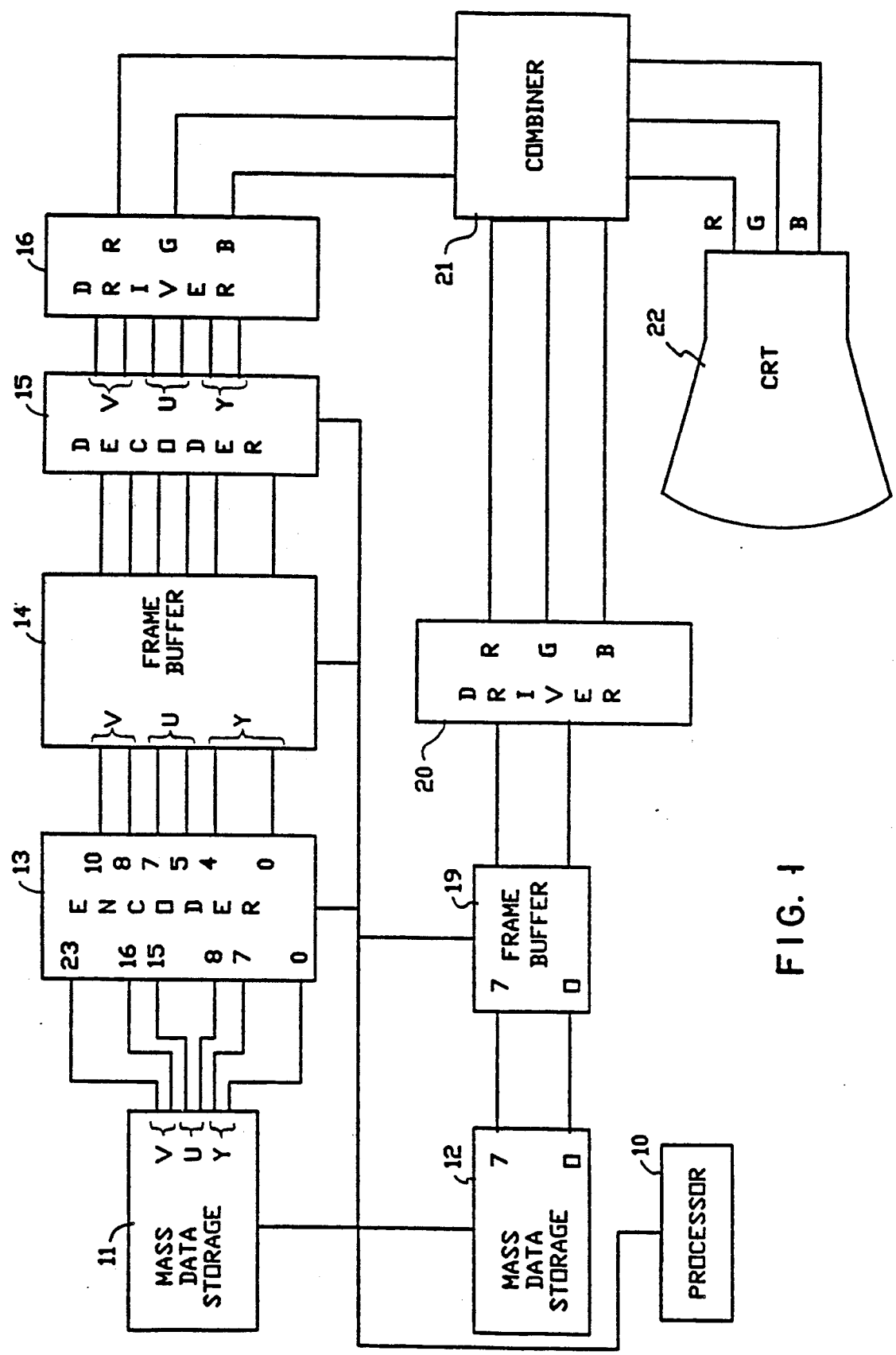
FIG. 1 is a block diagram of a system for compressing, storing and expanding pixel data for display on a CRT display.

Referring now to FIG. 1, there is shown a digital display system in which compressed and expanded data may be displayed, in accordance with a preferred embodiment of this invention. The system shown in FIG. 1 has a processor 10 which accesses one of two mass storage memories 11 or 12, and transfers the data of these memories 12 to various components to provide pixel data for display on CRT 22.

The system illustrated in FIG. 1 is representative of a multimedia display system wherein computer graphics, as well as natural scenery graphics, may be accessed for display on the CRT 22. Data defining natural scenery is contained in the mass data storage unit 11. This may be a CD ROM or other storage device capable of storing up to 24 bits per pixel. The multimedia systems shown in FIG. 1 may be used to display prestored natural scenery picture information or graphics data from storage memory 12, which may be alternatively displayed on the CRT 22. The graphics data in memory 12 may define each pixel to be displayed with only 8 bits. Computer graphics generally can be defined by one of 256 different colors, thus avoiding the need for a wide and diverse gray scale as is found necessary for the quality display of natural scenery images.

The system shown in FIG. 1 is schematic only of a system generally capable of displaying either the graphics data or natural scenery images.

To efficiently store the natural scenery image in a frame buffer 14 the full width luminance and chrominance pixel data is compressed into 8 bit data slices for each pixel. The compression of the 24 bit pixel data into 8 bit data slices is provided by an encoder 13. The compressed pixel data is of the type having 5 bits of luminance, packed with 3 bits of averaged U chrominance or 3 bits of averaged V chrominance. The U and V chrominance components represent a color vector as is known in color systems. The Y luminance level is the gray scale level and is defined by 5 bits of data, while each of the U chrominance values is also defined by 3 additional bits.

Shown in FIG. 1 is a decoder 15 which, upon presentation of the 8 bit compressed pixel data in the frame buffer 14, will expand and interpolate the data to full width 24 bit Y, U and V pixel data. A driver 16 is shown converting the 24 bit wide pixel data to a conventional R, G and B drive for the CRT 22.

The graphics data is similarly displayed on CRT 22. However, no compression is necessary with 8 bit graphics data which may be directly stored in a second frame buffer 19. The RGB driver 20 similarly drives the CRT 22 when each pixel is read from the frame buffer during scanning of the CRT 22. The RGB drivers 16 and 20 are connected by a combiner 21 to the CRT 22. The drivers 16 and 20 are effectively isolated from each other by combiner 21.

Figure 2:
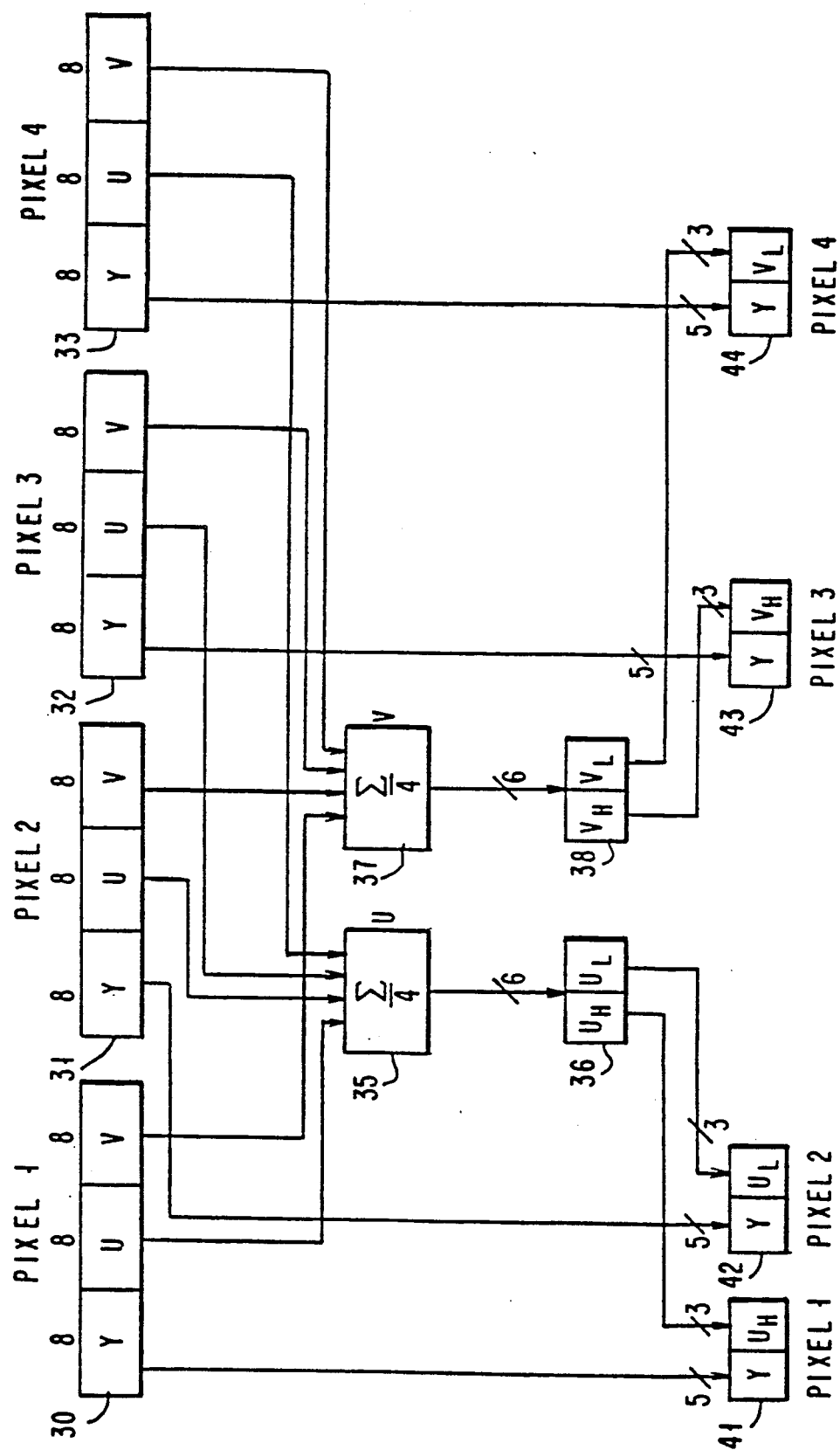
FIG. 2 is a schematic illustration of a circuit for compressing pixel data.

Reducing the data width of each pixel defining the natural scenery entails certain compromises. Referring to FIG. 2, there is shown the preferred encoding system of the present invention which encodes the 24 bit wide Y, U, V pixel data into 8 bit pixel data. The embodiment of FIG. 2 makes use of a subsampling the chrominance of four pixels which may be consecutive, row-organized pixels. Each of registers 30, 31, 32 and 33 will store the full width pixel data for the four consecutive pixels 1-4.

The invention makes use of a reduced luminance resolution by using only the first 5 significant bits of the luminance data for each pixel. Registers 41, 42, 43 and 44 include the compressed pixel data having a 5 bit luminance component, which are the 5 most significant bits of the original luminance pixel data.

In employing the foregoing technique, it may also be advantageous to employ luminance dithering to change the value of the encoded lower order luminance bit on some periodic basis.

The chrominance for each of the four pixels is subsampled. An average chrominance value U and V is taken for the 4 consecutive pixels. An average circuit 35 is shown, averaging each of the 8 bits of U chrominance data for pixels 1, 2, 3 and 4. Similarly, the V chrominance component is averaged in a circuit 37 to provide an average V chrominance.

In accordance with the preferred embodiment of the invention, each of the averaged U and V chrominance values are compressed by using the 6 most significant bits thereof. These 6 most significant bits are partitioned in two registers 36 and 38 between a portion representing the 3 most significant bits UH, VH and a portion representing the 3 least significant bits of the compressed data, UL and VL. As a further feature of the preferred embodiment, the higher order U and V bits are appended to the luminance data of pixels 1 and 3. The lower order compressed chrominance data $U_L$ and $V_L$ is appended to the luminance component of pixel 2 and pixel 4.

In this particular embodiment of the invention, the frame memory 14 will store each of the pixels in consecutive order. The 4 pixels are read out together and the data expanded in accordance with the technique to be described.

The foregoing invention makes use of a reduced luminance signal and subsampled chrominance signals for each of consecutive, spatially related pixels. The luminance signal need only be 5 bits wide. The expansion process to be explained will minimize the artifacts produced from subsampling the pixels. The natural scenery data may then be stored as 8 bit pixel data, reducing the requirement for memory size for the frame buffer 14 and realizing a respective cost saving. Further, the processor 10 can transfer such data at an increased speed over the previous 24 bit wide pixel data.

It is possible to achieve similar savings in mass storage by storing the compressed data in mass data storage unit 11. Those skilled in the art may therefore elect to compress the data in accordance with the foregoing before storing the data in the mass data storage unit 11.

Figure 3:
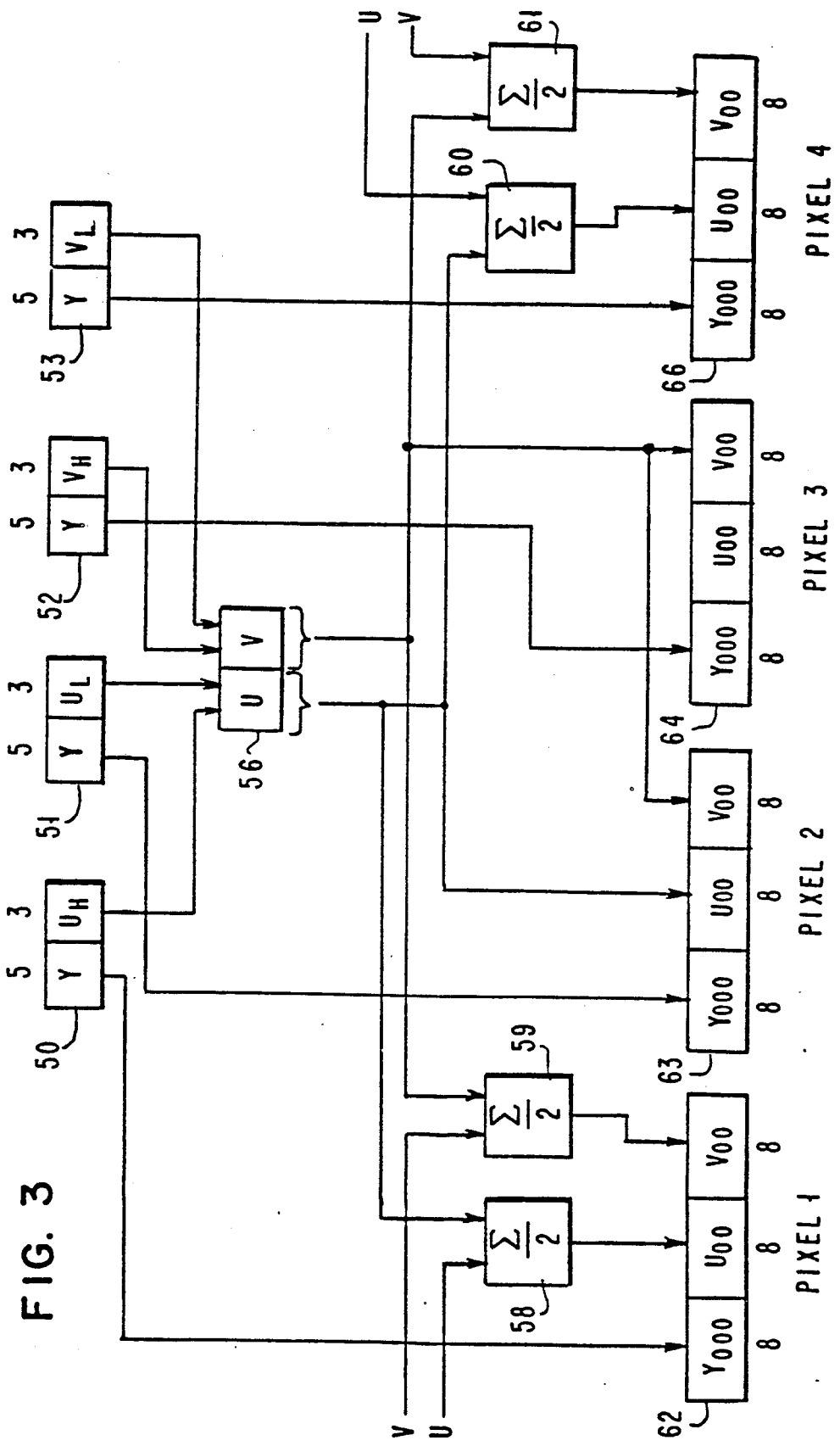
FIG. 3 is a schematic illustration of a decoder for expanding pixel data.

Referring now to FIG. 3, there is shown a particular expansion technique for expanding the compressed data back to a 24 bit wide luminance and chrominance signal.

The decoder includes a first set of registers 50, 51, 52 and 53 for receiving the compressed luminance Y value, for each of the 4 pixels read from buffer memory 14, as well as the compressed and subsampled chrominance values $U_H$, $U_L$, $V_H$ and $V_L$. A recombining network 56 combines each of the lower order portions and higher order portions of the chrominance $U_H$, $U_L$ and $V_H$, $V_L$ to produce a 6 bit compressed U and V chrominance signal. The output from network 56 is used directly to form the U and V chrominance signal for pixels 2 and 3 which are regarded as interior pixels in relation to pixels 1 and 4. Two lower order bits equal to 00 are added to the values of U and V, making U and V a full 8 bits wide. The restored pixel data for pixels 2 and 3 are inserted in registers 63 and 64.

The same expansion technique is applied to the luminance data in each of the registers 62, 63, 64 and 66. Three bits are added to the lower order compressed luminance pixel data, thus expanding the luminance signal to a full 8 bits wide. These lower order bits may be zeroes.

The boundary pixels 1 and 4 have U and V chrominance values which are averaged from preceding and succeeding groups of 4 pixels. The preceding groups of 4 pixels have an averaged U and V chrominance signal which is added to each of averaging circuits 58 and 59. These chrominance values for the preceding 4 pixels are averaged with the chrominance values for the 4 pixels represented in FIG. 3 to supply 6 bits of U and V chrominance for pixel Additionally, two lower order bits which may be 00 are added to the averaged compressed U and V chrominance components to provide a full 8 bit U and V chrominance signal for pixel 1 in register 62. In a similar manner, pixel 4 may be represented by U and V chrominance values derived from averaging circuits 60 and 61. These circuits average the U and V chrominance values for the subsampled U and V chrominance signals obtained from the succeeding group of pixels. The succeeding group of pixels will similarly, through a combination network 56, provide the U and V values for summation with the present U and V values of chrominance signals in averaging circuits 60, 61. The averaged chrominance U and V signal components are additionally expanded by adding lower order data bits, such as 00, to provide a full 8 bit wide U and V chrominance component in register 66.

Figure 4:
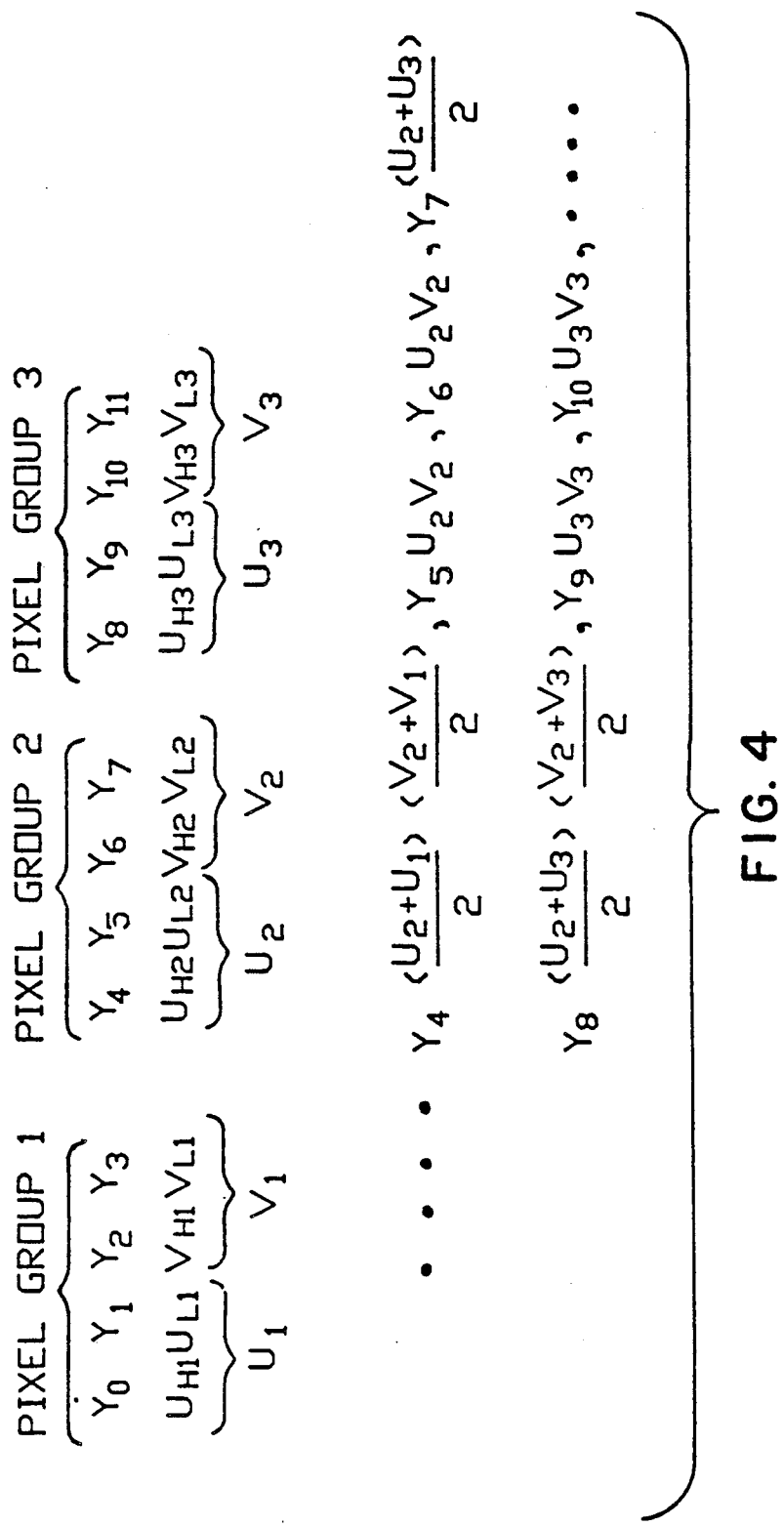
FIG. 4 illustrates a technique for interpolating expanded pixel data to reduce image transitions produced by pixel data compression.

The foregoing process of expanding the stored compressed data may be seen in FIG. 4. This Figure represents three groups of pixels, each having their own unique luminance component 5 bits wide, represented by $Y_0$ through $Y_{11}$ As described with respect to the encoder of FIG. 2, each of these pixels includes a portion of the U or V luminance component, $U_H$, $U_L$, $V_H$, $V_L$.

In expanding the data it is seen that the interior pixels represented by luminance levels $Y_5$ and $Y_6$ of pixel group 2 are decoded to have a value of subsampled U and V chrominance components equal to that appended to the pixels of group 2. The boundary pixels identified by luminance levels $Y_4$ and $Y_7$ have a value of U and V chrominance depending on the U and V chrominance of pixel groups 1, 2 and 3. These pixels may be further expanded using the foregoing technique of adding lower order data to each of the Y, U and V data components to obtain 24 bit wide pixel data.

The expanded data, when used to represent natural scenery, does not provide objectionable artifacts due to the judicious selection of subsampling in accordance with FIG. 4. Further, it is found that the reduced luminance resolution does not adversely effect the displayed image due to averaging the human eye. This is especially evident when dithering is employed during compression of the pixel luminance data.

Thus, there has been described one embodiment comprising a system for compressing natural scenery image pixels. The resulting frame buffer requirements are significantly relaxed, avoiding the unnecessary costs associated with large frame buffers. These principles may also be utilized to compress the data before storing in mass storage, thus realizing the saving of mass storage space. Those skilled in the art will recognize yet other embodiments which are described by the claims which follow.

Having thus described our invention, what we claim as new and desire to secure by Letters Patent is:

1. A method for converting multibit pixel data to a lesser number of bit pixel data comprising:
   supplying original pixel data having a plurality of bits of luminance information a plurality of bits of U chrominance information, and a plurality of bits of V chrominance information;
   selecting the most significant bits of luminance information as pixel luminance data;
   deriving an average of U chrominance signal information from a plurality of adjacent pixels;
   deriving an average of V chrominance signal information from said plurality of adjacent pixels; and,
   combining said significant bits of luminance information with said average U chrominance, and said average V chrominance signal, whereby each of said plurality of adjacent pixels is identified by a lesser number of bits than said original pixel data including the most significant bits of original pixel luminance data and average U and V chrominance pixel values.

2. The method of claim 1 further comprising dividing said U and V average chrominance signals into respective pairs of signals representing higher order and lower bits, and combining each of said divided signals with one of a plurality of adjacent pixel luminance data signals, whereby each pixel includes a unique luminance signal and a portion of an average U chrominance signal or average V chrominance signal.

3. The method of claim 1 further comprising selecting the most significant bits of the average U chrominance signal and V chrominance signal for combining with said pixel luminance data.

4. The method of claim 1 wherein said selected luminance bits are the five most significant bits of said original pixel luminance data.

5. The method of claim 4 wherein said average U chrominance and average V chrominance are the six most significant bits of average U and V chrominance values for four pixels.

6. The method of claim 3 wherein said U and V chrominance signals most significant bits are the six most significant bits of said averaged U and V chrominance signals.

7. A method of restoring full width pixel data from compressed pixel data comprising:
   grouping compressed pixel data into groups of four pixels, each having a compressed luminance data portion, and a related U or V chrominance data portion;
   averaging U and V chrominance data from the first and fourth pixels of adjacent groups of four pixels; and,
   arranging with each compressed luminance pixel data portion representing said first and fourth pixel an average U and V chrominance signal data, and arranging with second and third pixel luminance data portions a related compressed U and V chrominance signal data portion.

8. The method of claim 7 further comprising assigning a lower bit data portion to said compressed luminance data portions.

9. The method of claim 7 further comprising assigning a lower order bit data portion to said U and V compressed data portions.

10. The method of claim 8 wherein said lower order data portion comprises at least three zero valued bits.

11. A method for converting compressed pixel data which is grouped into groups of four adjacent pixels into full width pixel data comprising:
   selecting from said compressed pixel data data representing the luminance of each pixel;
   expanding the selected luminance data for each pixel by adding thereto lower order data bits to said selected data, whereby a full width luminance data signal is obtained for each pixel;
   selecting from said compressed pixel data a value of compressed U chrominance data as U chrominance data for intermediate pixels of said group of pixels;
   selecting from said compressed pixel data a value of compressed V chrominance data as V chrominance data for said intermediate pixels;
   averaging said compressed U chrominance data with U chrominance compressed data of another group of four pixels to derive an averaged U chrominance data for pixels defining a boundary of said group of four pixels; and,
   averaging said compressed V chrominance data with V chrominance compressed data of said another group of four pixels to derive V chrominance data for said pixels defining said boundary.

12. The method of claim 11 further comprising expanding each selected and averaged V and U chrominance data by adding thereto lower order data bits.

13. The method of claim 11 wherein said luminance data is expanded from five bits to eight bits.

14. The method of claim 11 wherein said U chrominance data and V chrominance data is expanded from six bits to eight bits.

15. An apparatus for converting multibit pixel data to a lesser number of bits pixel data comprising:

a mass storage memory for containing full width original pixel data comprising bits which define luminance information, bits which define a value of U chrominance and bits which define a value of V chrominance information;

an encoder connected to receive said pixel data, said encoder providing a compressed luminance data signal which comprises the most significant bits of said luminance information, and a U and V chrominance data signal comprising the average of a plurality of adjacent pixel U and V chrominance values; and, a frame buffer for storing said compressed luminance data signal and a related average U chrominance and V chrominance value.

16. The apparatus for converting multibit pixel data to a lesser number of bit pixel data according to claim 15 wherein said encoder includes means for reducing said average U and V chrominance values to a number of bits less than said original pixel data U chrominance values and V chrominance values.

17. The apparatus of claim 16 wherein said means for reducing said U and V chrominance average values selects the most significant bits of said average values as a compressed U and V chrominance signal.

18. The apparatus of claim 17 wherein said means for reducing said U and V chrominance average values further divides said most significant bits into first and second groups of least and most significant bits.

19. The apparatus of claim 18 further comprising means for grouping said divided first and second groups of bits of U and V average chrominance values with a compressed luminance pixel value for storing in said frame buffer.

20. An apparatus for decoding and expanding compressed pixel data representing a group of adjacent pixels comprising:

means for expanding data representing each luminance value of a pixel by adding lower order bits to said data representing said luminance value;

means for assigning values of U chrominance and V chrominance of said compressed pixel data to intermediate pixels of said group of pixels; and, means for averaging U and V chrominance pixel values contained in adjacent groups of pixels to determine U and V chrominance values for boundary pixels of said group of pixels.

21. The apparatus of claim 20 further comprising means for adding lower order data bits to each U and V chrominance value.

22. The apparatus of claim 21 wherein said luminance value is expanded from 5 to 8 bits.

* * * * *

UNITED STATES PATENT AND TRADEMARK OFFICE
CERTIFICATE OF CORRECTION

PATENT NO.  : 5,081,450
DATED       : January 14, 1992
INVENTOR(S) : Lucas et al It is certified that error appears in the above-identified patent and that said Letters Patent is hereby corrected as shown below:

In column 3, line 41, insert --Such techniques are well-known one method being described more particularly in IBM Docket YO988-030, describing use of an ordered dither. --

In column 4, line 47, after "pixel" insert --1--;
on line 68, after "$Y_{11}$" insert --.--.

In column 8, claim 20, line 17, change "pixel" to --pixels--

Signed and Sealed this

Seventh Day of September, 1993

Attest:

BRUCE LEHMAN

*Attesting Officer*    *Commissioner of Patents and Trademarks*